United States Patent
Kofler et al.

(10) Patent No.: US 11,762,928 B2
(45) Date of Patent: Sep. 19, 2023

(54) FEATURE RECOMMENDATION BASED ON USER-GENERATED CONTENT

(71) Applicant: SAP SE, Walldorf (DE)

(72) Inventors: Berno Kofler, Sankt Leon-Rot (DE); Anne Demel, Schwetzingen (DE)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 17/016,717

(22) Filed: Sep. 10, 2020

(65) Prior Publication Data

US 2022/0075835 A1 Mar. 10, 2022

(51) Int. Cl.
*G06F 16/9535* (2019.01)
*G06F 16/9538* (2019.01)
*G06N 5/04* (2023.01)
*G06F 16/9532* (2019.01)
*G06N 20/00* (2019.01)
*G06F 16/25* (2019.01)

(52) U.S. Cl.
CPC ........ *G06F 16/9535* (2019.01); *G06F 16/258* (2019.01); *G06F 16/9532* (2019.01); *G06F 16/9538* (2019.01); *G06N 5/04* (2013.01); *G06N 20/00* (2019.01)

(58) Field of Classification Search
CPC .............. G06F 16/9535; G06F 16/9532; G06F 16/9538; G06F 16/258; G06N 20/00; G06N 5/04
USPC ........................................................ 707/722
See application file for complete search history.

(56) References Cited

U.S. PATENT DOCUMENTS

| | | | |
|---|---|---|---|
| 9,081,857 B1 * | 7/2015 | Huet | G06F 16/9535 |
| 9,342,794 B2 * | 5/2016 | Mahler | G06N 20/20 |
| 9,785,953 B2 * | 10/2017 | Desal | G06Q 30/02 |
| 9,959,328 B2 * | 5/2018 | Jain | G06F 40/30 |
| 10,002,371 B1 * | 6/2018 | Baker | G06F 16/24578 |
| 10,943,407 B1 * | 3/2021 | Morgan | G16H 15/00 |
| 11,080,336 B2 * | 8/2021 | Van Dusen | G06Q 50/01 |
| 11,163,846 B1 * | 11/2021 | Kadayam | G06F 16/9535 |
| 11,651,412 B2 * | 5/2023 | Wilson | H04L 67/52 |
| | | | 706/46 |
| 2002/0083025 A1 * | 6/2002 | Robarts | G06F 21/6245 |
| | | | 706/12 |
| 2014/0079297 A1 * | 3/2014 | Tadayon | G06V 40/172 |
| | | | 382/118 |
| 2017/0091847 A1 * | 3/2017 | Cama | G06Q 50/01 |
| 2018/0218430 A1 * | 8/2018 | Prendki | G06Q 30/0641 |
| 2018/0218431 A1 * | 8/2018 | Prendki | G06Q 30/0631 |
| 2018/0303702 A1 * | 10/2018 | Novich | G06V 20/20 |
| 2019/0251446 A1 * | 8/2019 | Fang | G06F 16/51 |
| 2019/0325498 A1 * | 10/2019 | Clark | G06Q 30/0625 |

(Continued)

*Primary Examiner* — Mark E Hershley
(74) *Attorney, Agent, or Firm* — Buckley, Maschoff & Talwalkar LLC

(57) ABSTRACT

Provided is a system and method for automated recommendation of new features for addition to an item based on user-generated feedback. In one example, the method may include receiving, via a user interface, a search query associated with an object, retrieving user-generated content that describes the object based on the received search query, identifying, via a machine learning model, one or more features to be added to the object based on the retrieved user-generated content, and outputting identifiers of the one or more features to be added to the object via the user interface.

19 Claims, 11 Drawing Sheets

(56) References Cited

U.S. PATENT DOCUMENTS

| | | | |
|---|---|---|---|
| 2020/0034357 A1* | 1/2020 | Panuganty | G06F 16/215 |
| 2020/0126126 A1* | 4/2020 | Briancon | G06N 5/01 |
| 2020/0184278 A1* | 6/2020 | Zadeh | G06N 3/044 |
| 2021/0014136 A1* | 1/2021 | Rath | G06Q 30/016 |
| 2021/0042800 A1* | 2/2021 | Chandra | H04L 51/02 |
| 2021/0081865 A1* | 3/2021 | Darmour | G06Q 10/06315 |
| 2021/0103610 A1* | 4/2021 | Lee | G06F 16/435 |

* cited by examiner

FIG. 1B

Review of Brand X's Action Camera     150

I recently purchased the Series 5 Action Camera from Brand X. The controls are easy to use. However, the battery life is rather short (less than 2 hours before needing a charge), and the image quality struggles when capturing moving objects. — 152

Tanya R.
Aug. 5, 2020

Have you tried adding a bigger battery than provided by the manufacturer? — 154

Steve K.
Aug. 6, 2020

If you reduce the aperture size you can capture better quality images, but not perfect — 156

Terri B.
Aug. 6, 2020

The image quality gets better on the Series 5 when you use a flash, but the object must be pretty close — 158

Alice M.
Aug. 8, 2020

...
...

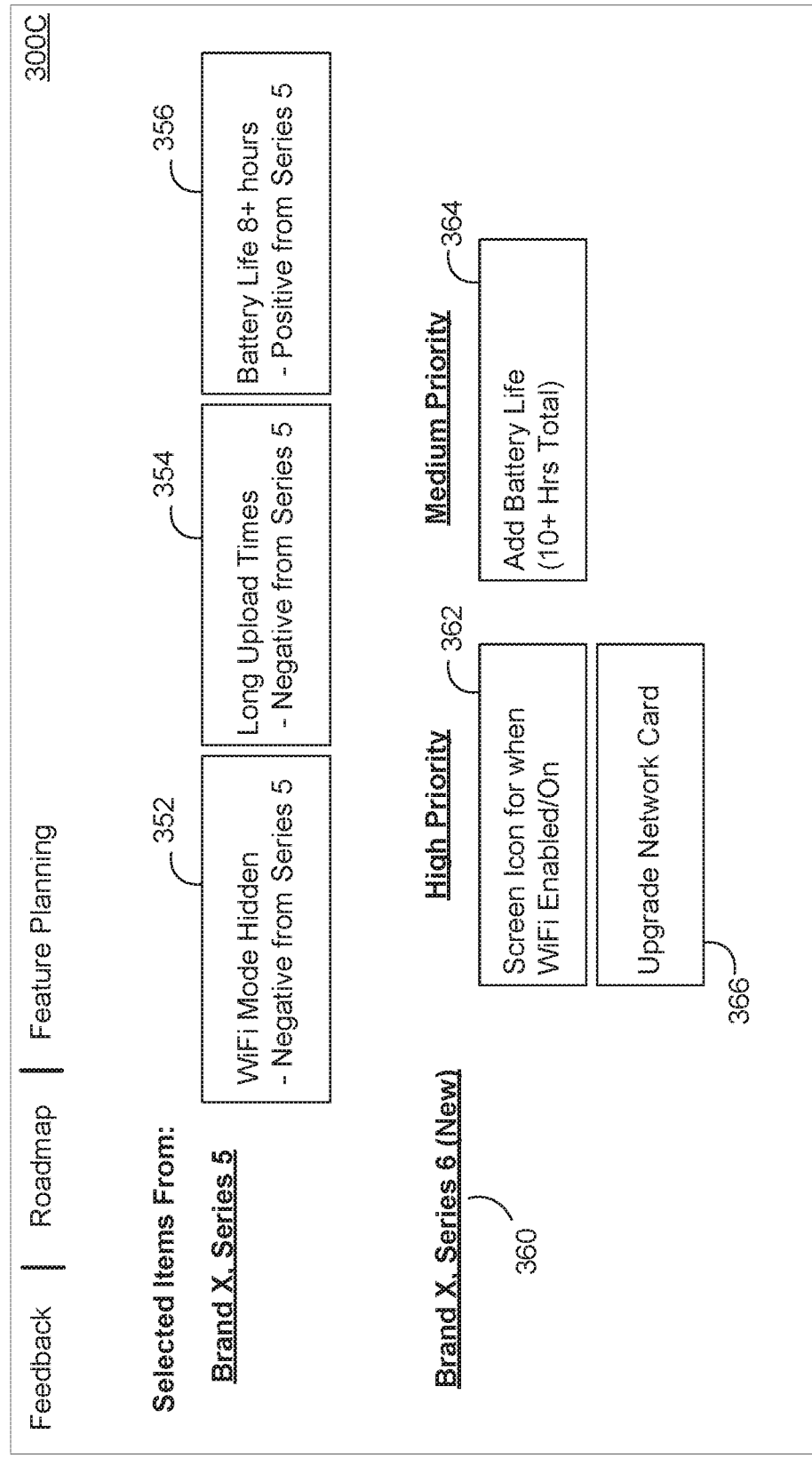

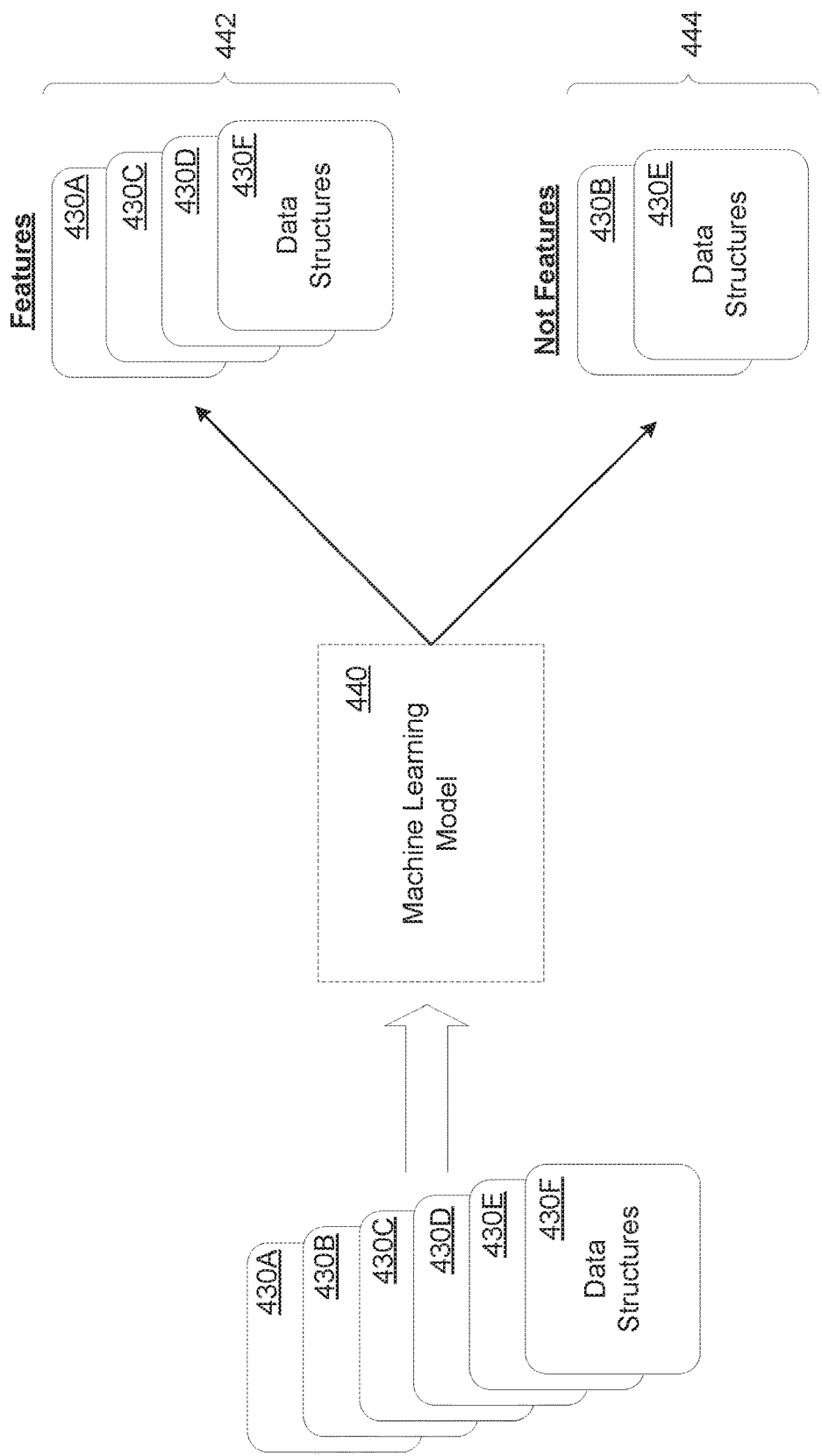

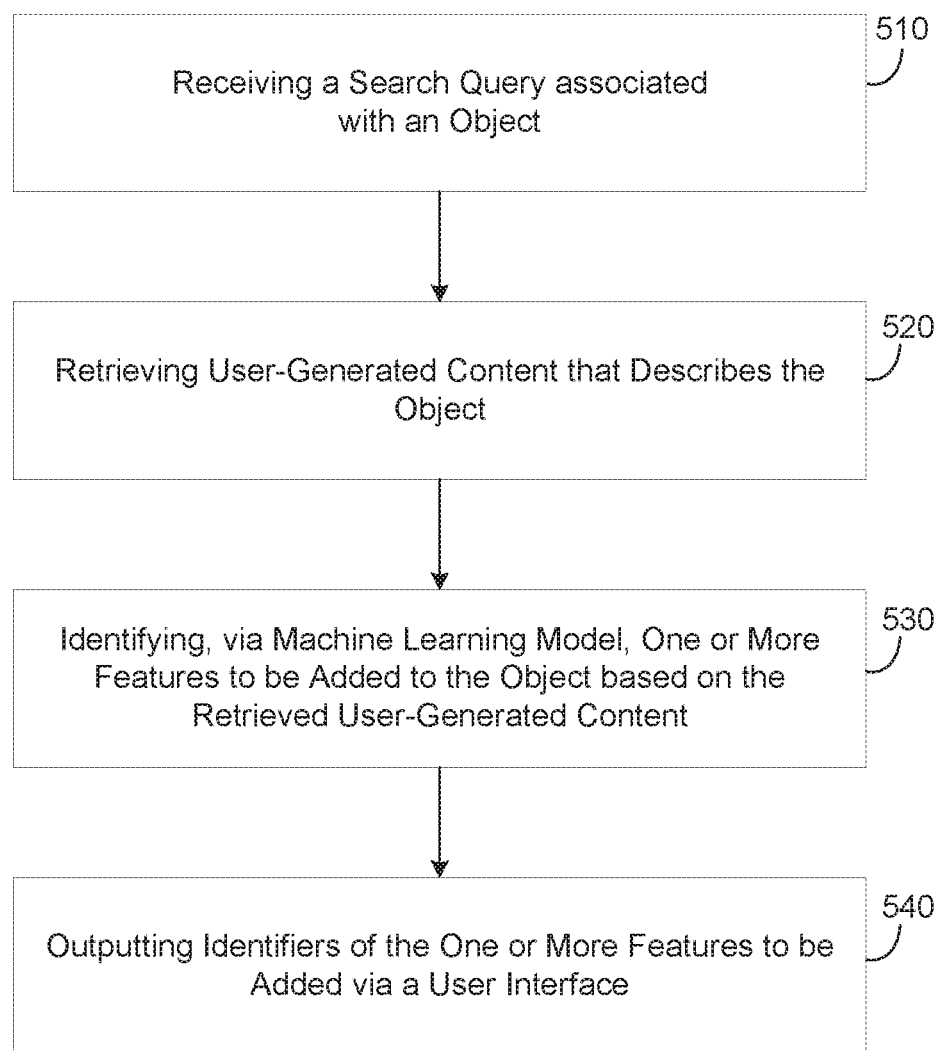

FEATURE RECOMMENDATION BASED ON USER-GENERATED CONTENT

BACKGROUND

Various media platforms and social networking sites provide content areas (e.g., forums, message boards, review areas, blogs, and the like) where users can upload or otherwise post their own descriptive content. A common purpose of the content areas is for users to provide reviews or feedback of an item based on a personal experience with the item. Because the content often includes a user's firsthand account, the content can provide valuable insight for other users interested in the same item.

However, many reviews are posted on forums, platforms, and sites which are not accessible to or otherwise monitored by a manufacturer of such item. For example, a consumer may purchase a coffee maker from an online shopping platform. Here, the user may post a review of the coffee maker on a message thread of the online shopping platform. In this case, unless the manufacturer is monitoring the message thread of the online shopping platform, the manufacturer will be unaware of the review. Furthermore, for the manufacturer (e.g., a user) to harness information included within the user-generated content, the user must have access to the content, know how to find the content, open the content, read the content, and comprehend the content. Doing this repeatedly to acquire feedback from many different users is not practical.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1B is a diagram illustrating user-generated content provided on a network accessible platform in accordance with an example embodiment.

FIGS. 3A-3C are diagrams illustrating a user interface providing search results and recommended features in accordance with an example embodiment.

FIG. 4B is a diagram illustrating a process of distinguishing between feature-related and non-feature related user-generated content in accordance with an example embodiment.

FIG. 5 is a diagram illustrating of a method of identifying features to be added from user-generated content in accordance with an example embodiment.

Figure 1A:
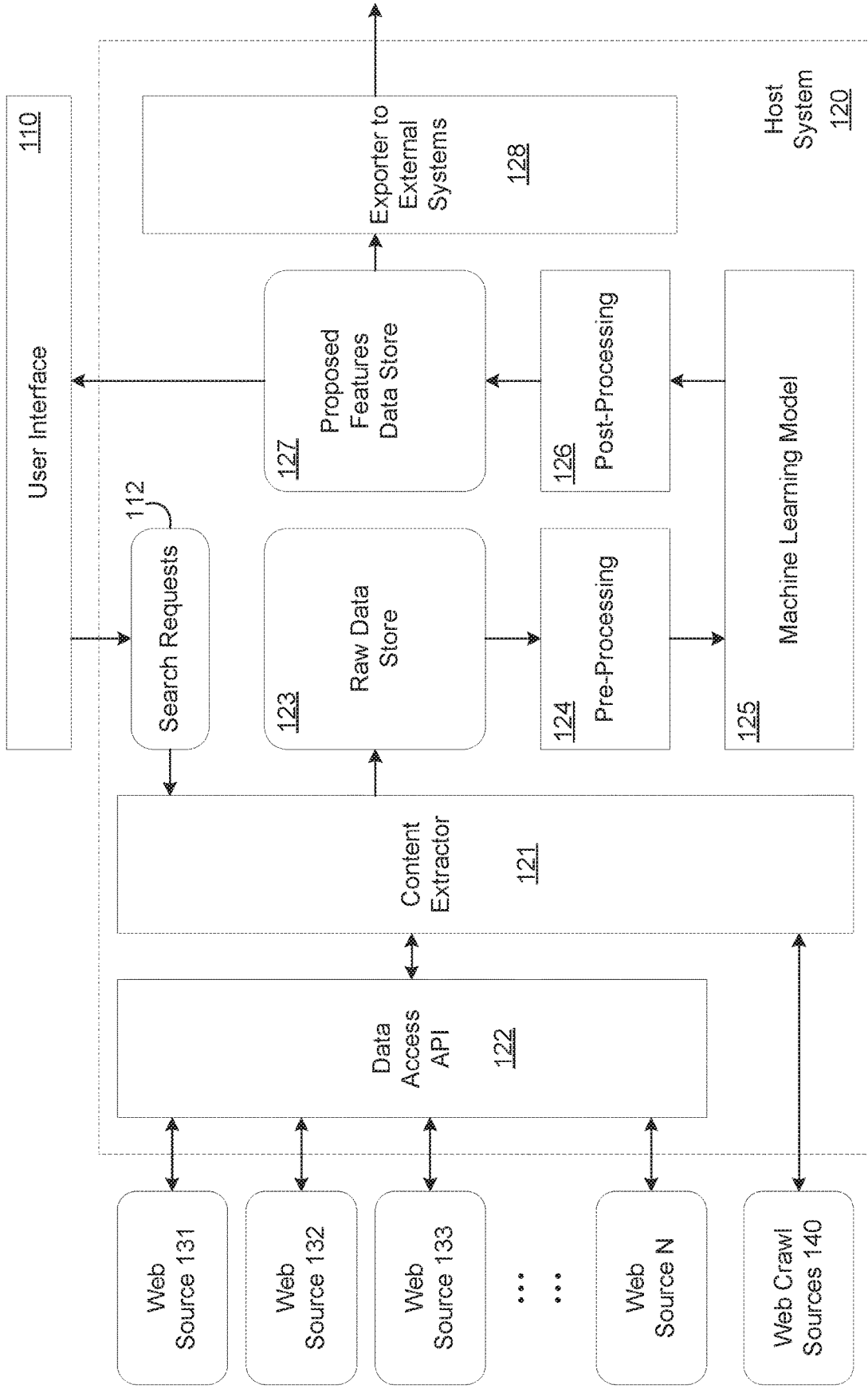
FIG. 1A is a diagram illustrating an architecture of a system for identifying features from user-generated content in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Developing an item (e.g., a product, an object, etc.) that will be successful is an expensive and complex process that involves a human making decisions based on their own knowledge of a domain. Here, the item may refer to tangible objects such as consumer devices, clothing, appliances, automobiles, and the like. As another example, the item may refer to software objects such as programs, services, APIs, web content, and the like. An organization may release a new item for purchase and wait to see how the item sells/performs. As the organization receives information (feedback) about the item, the organization (or a product developer) may make additional changes to the item and release updated versions of the item with different or modified features. However, because this process is left up to a person, the process is often error prone. Furthermore, it is difficult for a person to capture and adequately comprehend user-generated content from across many different platforms/sources.

The example embodiments are directed to an artificial intelligence system which provides developers with recommended features (e.g., upgrades, etc.) to be added to an item based on user-generated content that is posted about a previous or current version of the item. The system can provide a channel of information between the consumers of an item and the developers of such an item. The system can read user-generated content (e.g., feedback, reviews, posts, descriptions, etc.) of an item posted across many different platforms and process the user-generated content using a machine learning model to identify user-generated content that is related to new potential features. The system can model the user-generated content into multiple topics (features). Furthermore, the system can provide weights (priorities) to the topics based on factors such as how much content has been accumulated about a topic, likes, dislikes, message thread length, and the like. The system may output a list of potential features (topics) along with the weights/priorities of the features via a user interface.

The machine learning model may implement statistical techniques to give computer systems the ability to distinguish between user-generated content that is related to a product feature and user-generated content that is not related to a product feature, without being explicitly programmed but rather using a machine that is trained on historical user-generated content. The learning process may be progressive in that the learning improves the more times that the machine learning algorithm(s) is trained. The output of the machine learning model may be input to a topic modeling algorithm which divides the user-generated content related to features into specific topics. Here, the topics represent features, respectively. The topic modeling process may also extract keywords (e.g., a brief description of the new feature) from the user-generated content of a topic which summarizes the new features and display the keywords as indicators of the features to be added to the product.

Some of the benefits of the system described herein include automatic, intelligent, and efficient product design recommendations that are provided based on user-generated content (i.e., first-hand feedback) rather than relying on a product developer to decide which features to add. The system can leverage valuable user-generated content that already exists, or that will come to exist, across online shopping platforms, social media sites, message boards, surveys, ticket systems, customer relationship management (CRM) systems, enterprise resource planning (ERP) systems, data from file shares, interview transcripts, notes from workshops, other internal data systems, etc., process the user-generated content to find a subset of the user-generated content that is specific to features of an item, and suggest new features or modifications to existing features based on the user-generated. In doing so, the system can consolidate information from many different sites, platforms, boards, etc., and provide recommendations for new product features without requiring a developer to look for such user-generated content or even access the sites, boards, platforms, etc., where the content is from.

In response to a search query for an item, the system may acquire user-generated content posted about the item from the different platforms, via an application programming interface (API) of the system and/or APIs of the different platforms. Initially, the user-generated content may include posts that are related to product features and posts that are not related to product features. Through execution of the machine learning model, the system can identify which posts of user-generated content (e.g., unstructured strings of text) are related to a feature (any product feature) and which are not. Further, the system may extract the posts that are related to features of the item while ignoring, excluding, removing, or otherwise discarding the posts that are not.

Next, the system can identify a list of potential features that are to be added to the item or modified on the item from the descriptions within the user-generated content. For example, the system may perform a topic modeling process which identifies topics based on the descriptions within the user-generated content and provide a summary description of a new feature (e.g., increase battery life to 10 hours, etc.) based on keywords. The system can also identify a weight value associated with each feature which represents a priority of the feature with respect to other possible features that have been identified by the system. For example, the weight value may be based on an amount of pieces of user-generated content that mention the same feature, negative and positive keywords included in the user-generated content which describes the feature, other content within a message thread that includes the user generated content, and the like. For example, if a bigger battery is discussed in 25 different pieces of user-generated content and a smaller size device is discussed in 8 different pieces of user-generated content, the bigger battery may be given a greater weight since it is mentioned more often in the feedback. Furthermore, the system can output the list of features or just a subset of features that are recommended for the item, in response to the search query.

The system alleviates a user (e.g., a product developer) from having to access, read, or comprehend the user-generated content across different platforms. Instead, the system acquires the data and summarizes the data without the user. Furthermore, the system can automatically recommend features to be added to an item (or modified on the item) based on the acquired user-generated content using machine learning. That is, the system can read the user-generated content (e.g., reviews of an item), and make suggestions on how to improve the item based on keywords from the user-generated content. The system can elicit new features to be added to a product and classify or otherwise rank the new features as high priority or low priority. Furthermore, the system can export the recommend features into an external software application such as a planning software building a next design of the product.

FIG. 1A illustrates an architecture of a host system 100 for identifying features of an item from user-generated content in accordance with an example embodiment. For example, the host system 100 may be a cloud platform, a database (e.g., a multi-node database), a web server, a plurality of servers, a user device, a combination of devices, and the like. The item may refer to a tangible object (e.g., clothing, electronics, appliances, automobiles, televisions, etc.) or a non-tangible object (e.g., software, etc.) Referring to FIG. 1A, an external user may access the host system 100 via a user interface 110 that is output by the host system 100 and displayed on a screen of a user device (not shown). Here, the user device may connect to the host system 100 via a network, a cable, or the like. As further shown and described with respect to FIG. 2, the user interface 110 may include fields for receiving search queries (e.g., strings of text). For example, the user interface 110 may receive a search query which includes a brand name, a model name, a product name, a product description, or the like. In response, the host system 100 may generate a search request 112.

The search request 112 may be input to a content extractor 121 which processes the search request 112 asynchronously. In some embodiments, the content extractor 121 may identify one or more keywords that identify the item which are included in the search request 112. For example, the keywords may be a brand name, a model name, a product name, and the like. As another example, the content extractor 121 may enhance the search query with additional terms, or more limiting terms. For example, the search request may include a description of a product (e.g., Action Camera) and the content extractor 121 may identify one or more brand names or product names that manufacture or otherwise develop an Action Camera such as Brand X.

The content extractor 121 may query a plurality of web sources 131, 132, 133, . . . N via a data access API 122 to retrieve user-generated content associated with the item identified from the search request. For example, the data access API 122 may manage the format and that content (e.g., the keywords, etc.) included in the search request 112 transferred to the plurality of web sources 131, 132, 133, . . . N. In this example, the web sources 131, 132, 133, . . . N may include websites, online shopping platforms, mobile applications, web applications, social media platforms, ticket systems, CRM systems, ERP systems, data from file shares, interview transcripts, notes from workshops, other internal data systems, and the like. In response, the content extractor 121 may receive, via the data access API 122, user-generated content (e.g., posts, reviews, feedback, etc.) from each of the plurality of web resources 131, 132, 133, . . . N. Each web resource may provide a set of user-generated content (e.g., a plurality of posts). In addition, the content extractor 121 may also perform web crawling on various web sources 140 such as websites, social media platforms, and the like, to obtain user-generated content.

The raw user-generated content retrieved by the content extractor 121 may be stored in a raw data store 123. The user-generated content may be in the form of unstructured text strings which include words, phrases, characters, and the like. Before storing the user-generated content, the content extractor 121 may anonymize the user-generated content by removing usernames, IP addresses, device IDs, and the like, which are associated with the user-generated content. Thus, the raw data store 123 may store the anonymized user-generated content. Next, a pre-processor 124 may fetch the anonymized user-generated content from the raw data store 123, and clean the user-generated content by removing repetitive and/or filler words such that only a summary of the user-generated content remains. Here, the summary may include a shortened description that results from words and/or phrases being removed from a larger description included in the user-generated content. The cleaned user-generated content may be input into a machine learning model 125.

According to various embodiments, the machine learning model 125 may be trained to identify whether a piece of user generated content (e.g., a post, a thread, a discussion, etc.) is related to a product feature or is not related to a product feature. For example, the machine learning model 125 may be trained from historical user-generated content where some of the historical user-generated content includes a description of a feature or features, and some of the historical user-generated contend is not related to features. As a result, the machine learning model 125 can identify when a user-generated content mentions a product feature and when it doesn't. The machine learning model 125 may execute on the input cleaned user-generated content from the pre-processor 124, and identify a subset of user-generated content that includes a description related to features, and a subset of user-generated content that does not include a description of features. For example, the machine learning model 125 may identify posts, discussions, threads, etc. which are related to product features, and posts, discussion, threads, etc. which are not related to product features. Furthermore, the machine learning model 125 may output a list of the user-generated content that is feature related.

The machine learning model 125 may include a classification algorithm which classifies a piece of user-generated content as either a product feature or not a product feature. A post processor 126 may receive the pieces of user-generated content that are classified as features, generate a succinct list of the features (summarizing the specific features), and identify weights associated with each feature. The summarized features may include a few words of description which succinctly describe the feature (e.g., display icon when WiFi mode is on, etc.)

In some embodiments, the post processor 126 may add a weight to a feature based on how many pieces of user-generated content discuss the feature, a number of likes and/or dislikes associated with the user-generated content, attributes of a discussion thread where the user-generated content is extracted from (e.g., length of the discussion thread, positive and/or negative feedback in the discussion thread, etc.), and the like. For example, if a user-generated content is similar to or the same as a previously identified feature, rather than create a new feature for the list, the post-processor 126 may increase the weight value of the already identified similar/same feature. Here, the post-processor 126 may keep a counter value that represents the number of pieces of user-generated content that mention a product feature. For example, the counter value may identify a number of posts, discussions, threads, etc. which mention the product feature.

The identified product features may include new features that are not present in the product (e.g., a new display feature, a new piece of equipment, a new functionality, etc.) As another example, the identified product features may include modifications or upgrades to existing product features (e.g., increased storage capacity, increased battery life, modified imaging settings, etc.). In some embodiments, the post processor 126 may create a ranking/rating of the proposed features. For example, features that are mentioned a predetermined number of times or in a predetermined percentage of pieces of user-generated content may be given a high priority, while other features may be given lower or medium priorities.

The identified product features, respective counter values, respective weight values, and the like, may be stored in a pool of proposed features within a data store 127. The data store 127 may include an aging mechanism which monitors how long a proposed feature has been present within the data store 127. If the length of storage of the proposed feature within the data store 127 exceeds a predetermined threshold of time, the data store 127 may archive the proposed feature to disk and remove it from the data store 127.

A user may access the data store 127 via the user interface 110 to view information about the pool of proposed features including the weight values. Furthermore, the user may request any proposed features to be exported into an external software application such as a resource planning application. In response, the host system 120 may export a description of the proposed feature along with the weighted value, counter value, etc., to the external software application via an exporter 128.

FIG. 1B illustrates an example of user-generated content 150 provided on a network accessible platform in accordance with an example embodiment. For example, the network accessible platform may be an online shopping platform, a social media platform, a website, a software application, a mobile application, a message board, and the like. Here, the user-generated content may be retrieved by the content extractor 121 via the data access API 122, shown in FIG. 1A. Referring to FIG. 1B, the user-generated content 150 include a discussion thread related to Brand X's Action Camera. In this example, a first user starts the thread with a post 152 describing her experience with an item (i.e., Brand X's Series 5 Action Camera). Other users may add-on to the initial post 152 with subsequent posts 154, 156, and 158 which are related to the review of Brand X's Action Camera. Each post 152-158 may include a string of text (e.g., letters, characters, words, sentences, paragraphs, etc.) which is in a structured format or an unstructured format.

Figure 2:
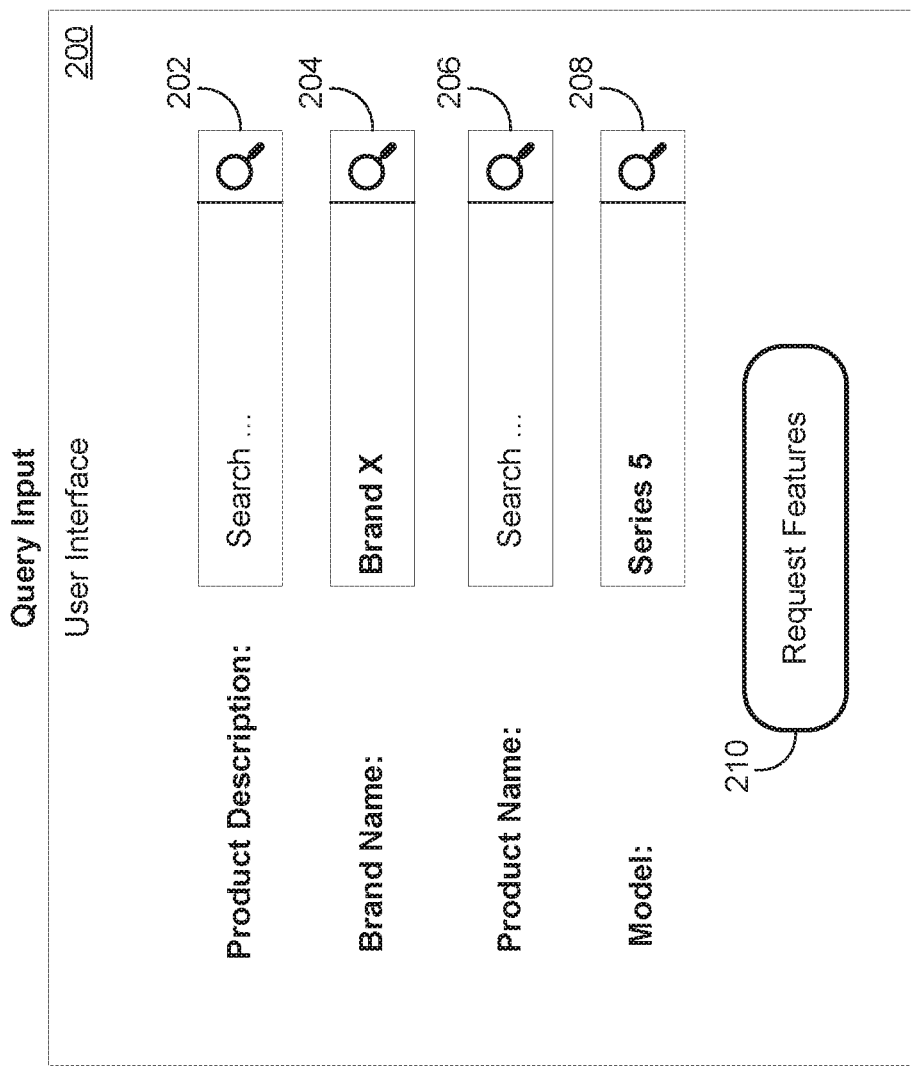
FIG. 2 is a diagram illustrating a user interface for querying user-generated content for features in accordance with an example embodiment.

Referring again to FIG. 1A and FIG. 2, the content extractor 121 may receive a search query via a user interface 200 (e.g., shown in FIG. 2). For example, the user interface 200 may include fields for receiving input of descriptive text 202, a brand name 204, a product name 206, a model name/number 208, and the like. A user may input text into any of these fields 202, 204, 206, and 208, and submit a search request 112 by pressing button 210. In the example of FIG. 2, the user has provided input into field 204 for brand name and field 208 for model name. In response, the content extractor 121 may receive the search request 112, generate a search query which includes a keyword or keywords associated with the search request, and transmit the search query to the plurality of web sources 131, 132, 133, . . . N. In response, the content extractor 121 may receive multiple pieces of user-generated content including the user-generated content 150 shown in FIG. 1B.

Figure 3A:
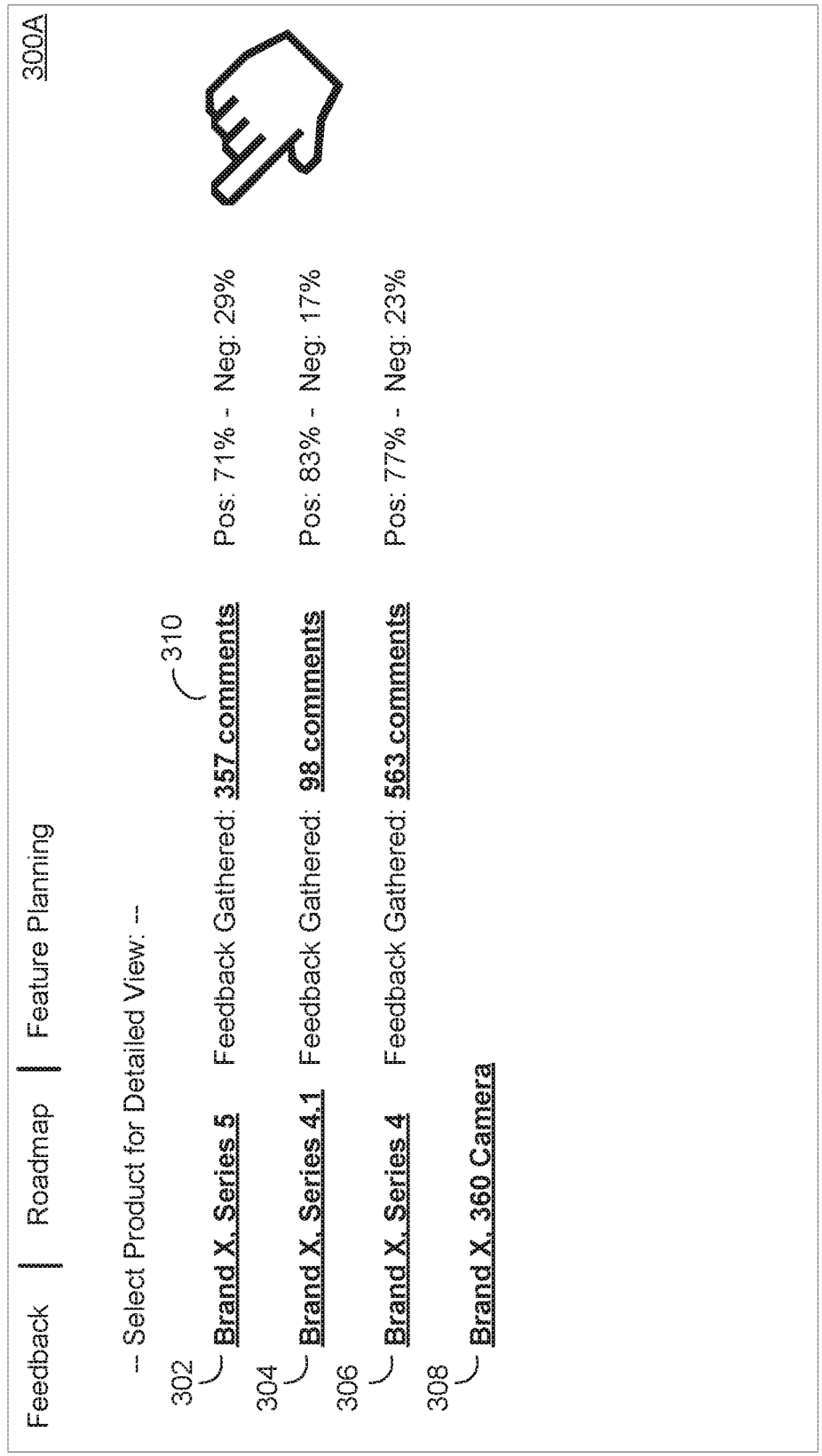

Referring to FIG. 3A, the search request for brand name (e.g., Brand X) and model name (e.g., Series 5) results in the content extractor 121 extracting user-generated content that is associated with Brand X's Series 5 Action Camera. Referring to FIG. 3A, a user interface 300A includes search results 302, 304, 306, and 308 associated with the search query input via the user interface 200 of FIG. 2. Here, the system identifies a search result 302 for the brand name/model name pair that is input into the user interface 200 as well as search results 304, 306, and 308 which correspond to similar product models of the same brand that are not quite the exact same as the model searched for, but which include overlapping content. The system may enhance the search query to add additional/surrounding terms based on its knowledge of the product base. In this case, the search results include results for Series 5, but also search results of other similar models (Series 4.1, Series 4, 360 Camera, etc.) that are related to the Series 5 model.

In some embodiments, the search results may include links which provide the viewer with the ability to further drill-down into the details of a product, model, brand, etc. For example, a user may select the link Brand X, Series 5 on the user interface 300A and navigate to additional product details. As another example, the user may select a link 310 which allows the user to view the user-generated content associated with the particular search results. The user interface 300A also provides a summary of the positive and negative user-generated content with respect to a particular product.

Figure 3B:
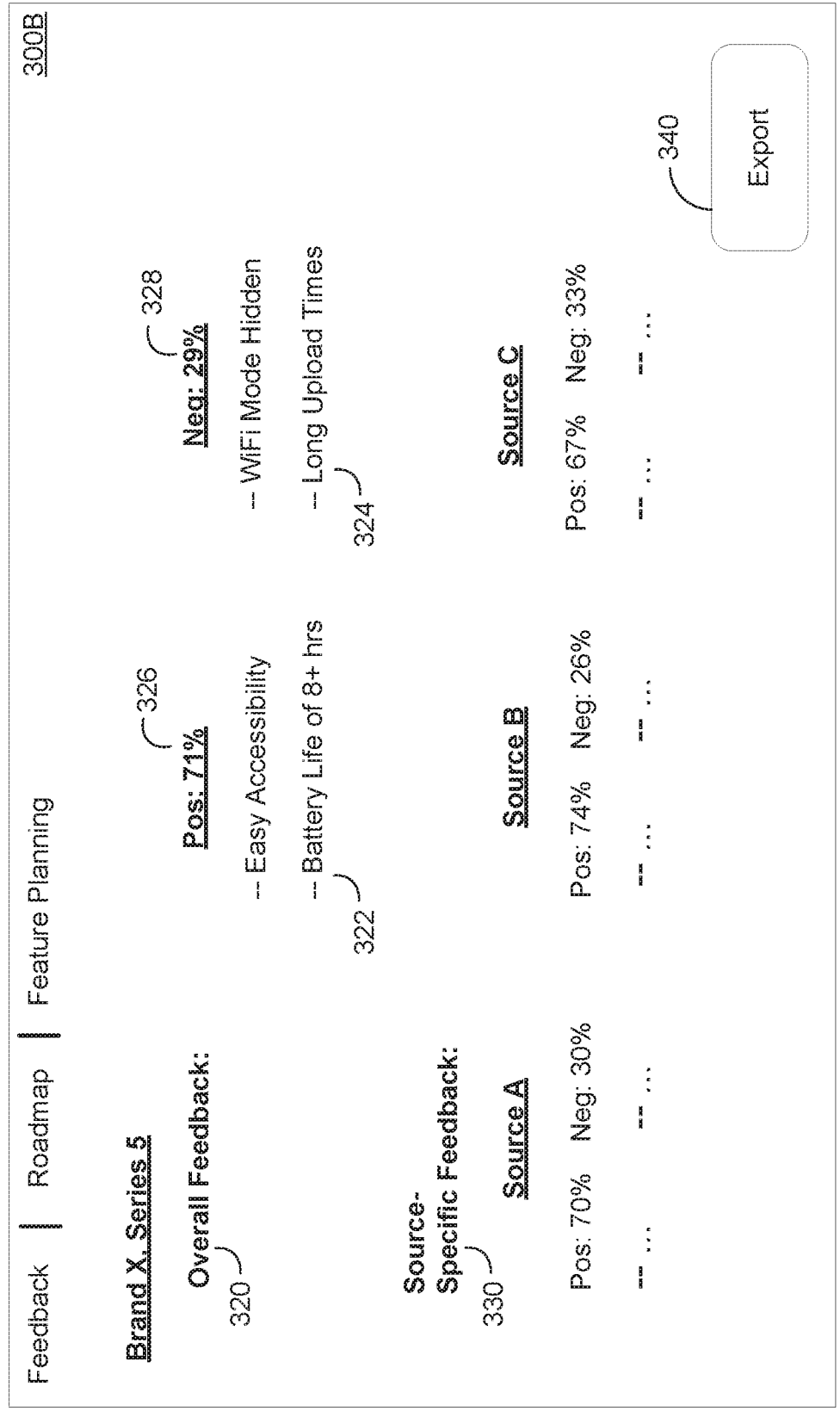

Referring now to FIG. 3B, a user interface 300B is shown after a user has selected the search result 302 in FIG. 3A. In response, the system provides different granularities of user feedback that has been identified from the user-generated content. For example, in FIG. 3B, the user interface 300B includes overall feedback 320 from all of the different media platforms, etc. where user-generated content has been extracted from. Thus, a summary from the entire search space can be provided as part of the overall feedback 320. The overall feedback 320 includes positive feedback 322 and negative feedback 324, as well as indicators 326 and 328 of the percentage of users that provided the positive feedback 322 and the negative feedback 324, respectively.

In addition to the overall feedback 320, the system may also provide source-specific feedback 330. Here, the source-specific feedback 330 may include the same data as the overall feedback 320, but for specific web-based resources. For example, each of a social media platform, an online shopping platform, a web applications, and a mobile application, may each have a respective source-specific feedback that provides smaller granularities of feedback from the specific resources. Furthermore, the user interface 300B may include an export button 340 which when selected enables any of the feedback items to be integrated into recommendations within an external software application that is communicably connected to the system. Here, the user may select various items from the overall feedback 320 and/or the source-specific feedback 330. Then, when the user selects the export button 340, the items may be converted into descriptions of new features and/or modifications to existing features that are exported into the software application as shown in the example of FIG. 3C.

Referring to FIG. 3C, a user interface 300C includes a listing of the features 352, 354, and 356 that are selected from the overall feedback 320 in the user interface 300B of FIG. 3B. Furthermore, the user interface 300C includes a listing of features 362, 364, and 366 to be added or otherwise included in a new product 360 (i.e., Brand X, Series 6 Action Camera) which is under development.

Figure 4A:
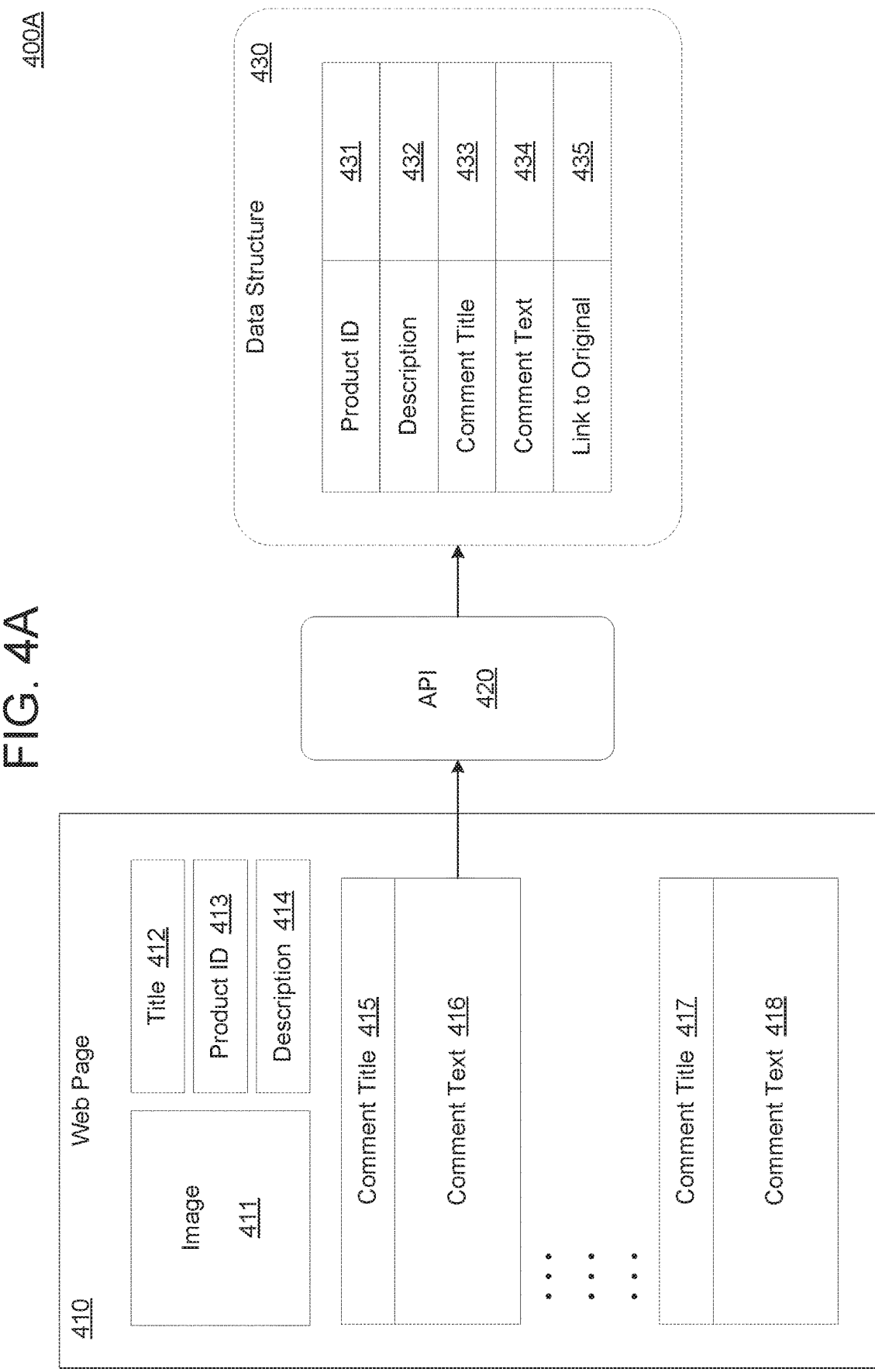
FIG. 4A is a diagram illustrating a process of converting user-generated content into a data object in accordance with an example embodiment.

FIG. 4A illustrates a process 400A of converting user-generated content into a data structure in accordance with an example embodiment. Referring to FIG. 4A, one or more application programming interfaces (API) 420 may be used to convert user-generated content in a native format of a source platform into a generic data structure format 430 that is consumable by the system described herein. In this example, the user-generated content is displayed on a web page 410 of an external source such as a social media site, online shopping platform, message board, product review site, or the like, however, embodiments are not limited thereto. The web page 410 includes an image 411 of a product, a title 412 of the product, a product ID 413, a product description 414, and a plurality of different comments.

The web page 410 also includes user-generated content 415, 416, 417, and 418 disposed underneath the product information on the web page 410. Here, the web page 410 may provide predefined content areas where external users can post comments, feedback, reviews, etc., about the product. In this example, each piece of user-generated content includes a title and a text associated with a comment. For example, a first piece of user-generated content includes a comment title 415 paired with a comment text 416 (description). Likewise, a second piece of user-generated content includes a comment title 417 paired with a comment text 418. In this example, the API 420 retrieves the first piece of user-generated content including the title 415 and the comment text 416 and stores it within a data structure 430. In this case, the API 420 may be used to help map data from a native location on the web page 410 (or other source, page, file, etc.) into predefined fields 431-435 of the data structure 430. For example, the system may retrieve data via the API 420 of the host system via one or more APIs (not shown) of the external platforms, and convert it from the native format of the external platforms into the generic format of the data structure 430 with predefined fields 431-435. It should also be appreciated that the API 420 may be used to map data from other systems besides web pages into the data structure 430. Examples of other systems include ticket systems, CRM systems, ERP systems, data from file shares, interview transcripts, notes from workshops, and the like, which have a different format than the data structure 430.

The data structure 430 may include a table with a plurality of rows and columns, an index, a data object, a blob, and/or the like. Data conversion may include type conversion (e.g., string to numeral, etc.), field mapping, and the like. The system may also generate a transcript in case of audio files or video files which include recordings of customer workshops, visits, product review videos, and the like. Also, additional fields may be included in the data structure 430 such as number of likes, number of dislikes, thread length (e.g., number of additional/trailing comments), ratings, and the like.

Not all of the data may be added from the source, but examples of data that can be added include a product ID 431, a product description 432, a comment title 433, a comment text 434, and a link (e.g., a uniform resource locator, network address, etc.) of the web page 410. Each piece of user-generated content may be stored in a different respective data structure 430. As another example, multiple pieces of user-generated content (e.g., multiple comments, feedbacks, etc.) may be stored together in a same/common data structure.

FIG. 4B illustrates a process 400B of distinguishing between feature-related and non-feature related user-generated content in accordance with an example embodiment. Referring to FIG. 4B, the host system may acquire a plurality of data structures 430A-430F corresponding to a plurality of pieces of user-generated content. Here, the user-generated content may include feedback or reviews on any aspect related to a product, an organization, a service, etc. The host platform may store and execute a machine learning model 440 which can distinguish between feature-related user-generated content 442 and non-feature related user-generated content 444.

For example, the machine learning model 440 may be trained from historical user-generated content which has been previously labeled as feature-related and non-feature related. For example, the machine learning model 440 may include a classification-based machine learning model, but embodiments are not limited thereto. The machine learning model 440, when executed, may identify patterns of words within the text description of the user-generated content which is an indicator of a feature. The machine learning model 440 may be stored within a memory or other area accessible to the host platform. The host platform 440 may trigger execution of the machine learning model 440 based on query received via the user interface, such as shown in the example of FIG. 2.

Figure 4C:
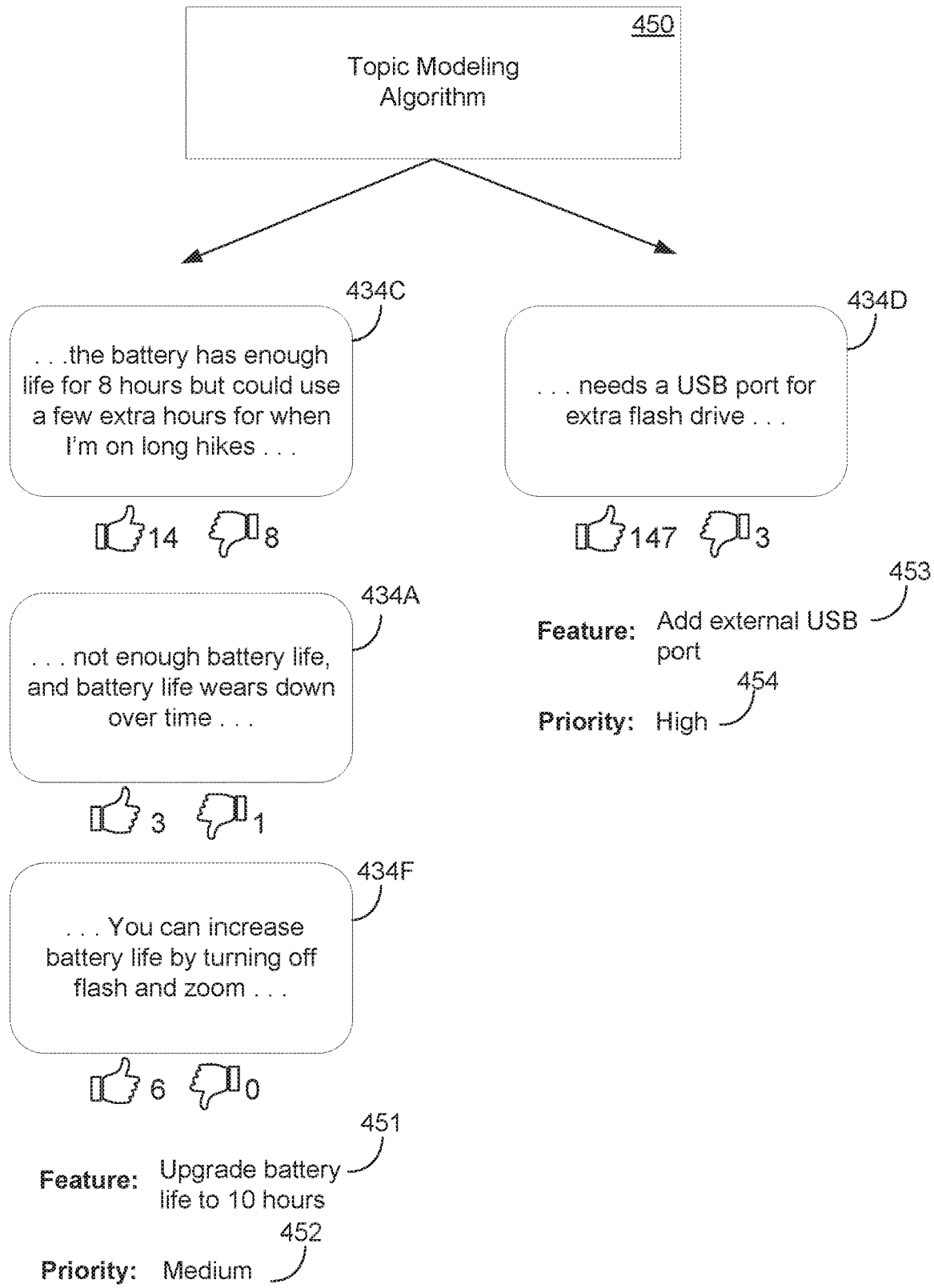
FIG. 4C is a diagram illustrating a process of topic modeling of user-generated feature-related content in accordance with an example embodiment.

FIG. 4C illustrates a process 400C of topic modeling of user-generated feature-related content in accordance with an example embodiment. Referring to FIG. 4C, the output of the machine learning model 440, including the user-generated content identified as being related to product features, may be input into a topic modeler 450. The topic modeler 450 may include an algorithm which splits the user-generated content into a plurality of topics, where each topic corresponds to a different product feature to be added. Furthermore, the topic modeler 450 may accumulate (group together semantically similar features) user-generated content associated with a common topic. In the example of FIG. 4C, three pieces of user-generated content (comments 434C, 434A, and 434F) are directed towards the topic of battery life.

The topic modeler 450 may group or otherwise cluster the data of the same topic together, thereby accumulating the user-generated content of the same topic. Meanwhile, the topic modeler 450 identifies only one user-generated content (comment 434D) directed to a second topic of adding a USB port. Here, the topic modeler 450 may create a summary description of each topic. For example, the first topic including comments 434C, 434A, and 434F, may be summarized into a description 451 which includes "upgrade battery life to 10 hours". The second topic including comment 434D may be summarized into a description 453 which includes "add external USB port."

Furthermore, the topic modeling algorithm 450 may determine weights or priorities associated with the different features. The weights may be determined based on various factors including how much user-generated content has been accumulated for a given topic (e.g., a number of comments about a particular feature), ratings by other users of the user-generated content that describes the feature, thread length (e.g., additional comments under the user-generated comment), and the like. In this example, a weight 452 of "medium" is added to the description 451 of the feature "upgrade battery life to 10 hours" and a weight 454 of "high" is added to the description 453 of the feature "add external USB port." In this case, the total number of comments about the battery life are more than the total comments about the USB port, however, the likes associated with the USB port comment are significantly higher, resulting in a higher priority. Both the descriptions 451 and 453 and the weights 452 and 454 may be output for display via a user interface (such as the user interface 300C shown in FIG. 3C).

FIG. 5 illustrates a method 500 of generating recommended context for a predictive model in accordance with an example embodiment. For example, the method 500 may be performed by a database node, a cloud platform, a server, a computing system (user device), a combination of devices/nodes, or the like. Referring to FIG. 5, in 510, the method may include receiving, via a user interface, a search query associated with an object. For example, the search query may include a name of an item (e.g., a product, property, etc.), a brand name, a short description, or the like. The user interface may have different fields for entering any of the above-information. For example, the search query may include one or more of a name of the object, a name of a model of the object, and a description of the object, input via one or more fields of the user interface. In some embodiments, the method may further include modifying the search query to include an additional descriptive term associated with the object.

In 520, the method may include retrieving user-generated content that describes the object based on the received search query. For example, the retrieving may be performed via an API of the external sources and/or the host system. Here, the host system is able to access multiple different sources (e.g., via multiple different APIs offered by the sources). Thus, the host system can retrieve user-generated content from different sites, boards, online marketplaces, and the like. The content may have different formats depending on the site where the content is retrieved from. The host platform may include an API layer which is able to convert the user-generated content into data structures that comprise a predefined generic format which includes values extracted from the user-generated content stored in predefined fields corresponding to object attributes. Also, instead of using an API, the host system may include a web crawler that extracts relevant data from web page-based sources in agreement with a service provider.

In 530, the method may include identifying, via a machine learning model, one or more features to be added to the object based on the retrieved user-generated content, and in 540, outputting identifiers of the one or more features to be added to the object via the user interface. The machine learning model may be stored in a memory of the host platform and executed in response to a control signal from a processor of the host platform.

The machine learning algorithm may be trained from historical feedback (user-generated content) to distinguish between content that is related to (describes) object features (or product features) and content that is not related to object features. The training may be performed by inputting many different user-generated content pieces into the machine learning algorithm that describe features as well as many different user-generated content pieces that do not describe features. As a result, the machine learning model can learn to identify patterns of text or words within the user-generated content that is related to a product feature. Meanwhile, the user feedback that is not related to an object (product) feature may refer to feedback about other topics such as customer support, pricing, service and repairs, and the like. The non-related feedback may be removed or otherwise ignored by the system so that it is not part of a feature identification process. In some embodiments, the identifying may include identifying a highest priority feature from among the identified one or more features to be added to the object based on an accumulation of user-generated content.

In some embodiments, the method may further include a topic modeling process to identify the features to be added based on the user-generated content that is distinguished as being related to features of the object. For example, the method may include identifying a plurality of topics from the user-generated comments that describe features via a topic modeling algorithm. For example, a plurality of sentences of user-generated content that describe a desire to have more room for photos on a mobile device, may be modeled into the topic of adding extra memory to the mobile device. As another example, a plurality of sentences of user-generated content which describe that a phone keeps losing its charge may be labeled under the topic of increased battery size. Furthermore, the outputting may include outputting descriptive identifiers of the plurality of topics as features to be added to the object, via the user interface.

Figure 6:
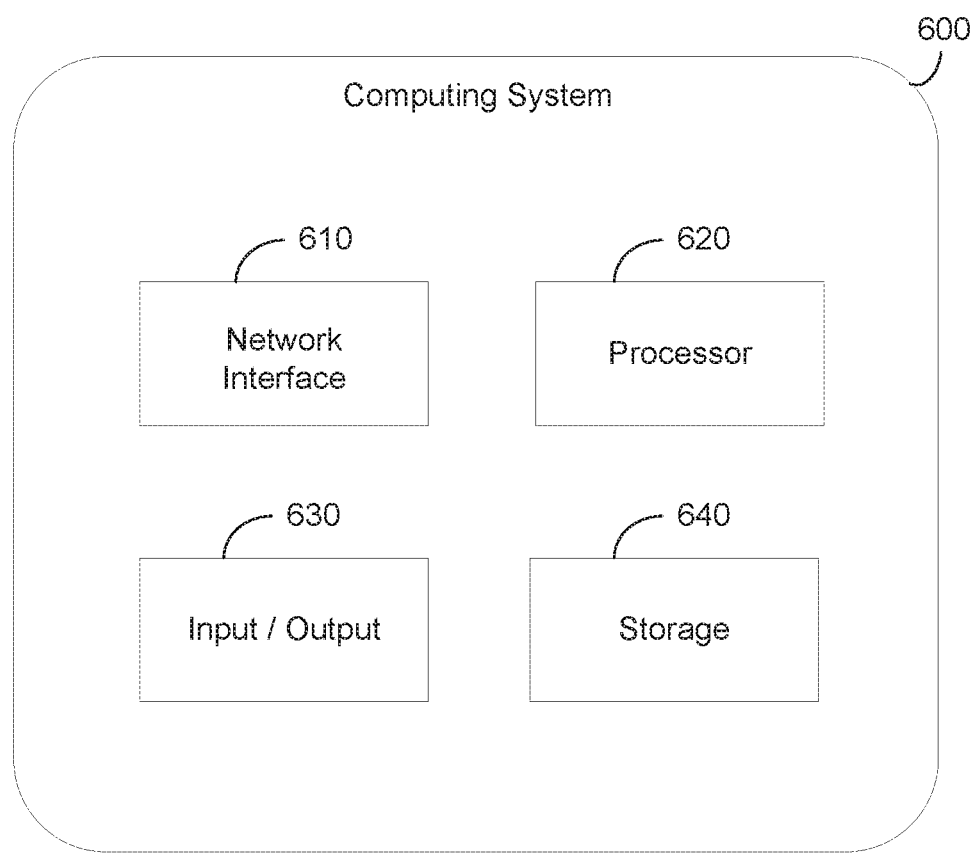
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 6. According to various embodiments, the storage 640 may include a data store that stores data in one or more formats such as a multidimensional data model, a plurality of tables, partitions and sub-partitions, and the like. The storage 640 may be used to store database records, items, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory storing a topic modeling algorithm; and
a processor configured to
receive, via a user interface, a search query associated with an object,
retrieve data structures comprising user-generated content that describes the object based on the received search query,
execute a machine learning model on the user-generated content within the data structures to identify a first subset of data structures with user-generated content corresponding to feature-related data of the object therein and a second subset of data structures with user-generated content corresponding to non-feature related data therein based on patterns of words in the data structures, divide the first subset of data structures with the feature-related data of the object identified by the machine learning model into a plurality of clusters corresponding to a plurality of different features of the object, respectively, via execution of a topic modeling algorithm, rank the plurality of different features based on how many records are included in each cluster to identify a highest ranking feature, determine a recommended upgrade to the highest ranking feature of the object from among the plurality of different features based on the execution of the topic modeling algorithm on data structures within a cluster from among the plurality of clusters which corresponds to the highest ranking feature; and output an identifier of the recommended upgrade to the feature of the object via the user interface.

2. The computing system of claim 1, wherein the processor is further configured to convert the user-generated content into the data structures, where each data structure comprises a predefined format which includes values extracted from the user-generated content stored in predefined fields corresponding to object attributes.

3. The computing system of claim 1, wherein the processor is configured to determine the highest priority feature to be added to the object from among the plurality of different features based on weights added to the plurality of different features by the topic modeling algorithm.

4. The computing system of claim 1, wherein the search query comprises one or more of a name of the object, a name of a model of the object, and a description of the object, input via one or more fields of the user interface.

5. The computing system of claim 1, wherein the processor is further configured to modify the search query to include an additional descriptive term associated with the object.

6. The computing system of claim 1, wherein the processor is configured to identify a new feature to add that is not present in the object based on execution of the topic modeling algorithm on the data structures within the cluster.

7. The computing system of claim 1, wherein the processor is configured to generate a summary description from the data structures within the cluster from among the plurality of clusters, and output the summary description with the recommended upgrade to the highest ranking feature via the user interface.

8. The computing system of claim 1, wherein the processor is further configured to export a description of the recommended upgrade to the highest ranking feature into an external software application used for designing the object.

9. A method comprising:

receiving, via a user interface, a search query associated with an object;

retrieving data structures comprising user-generated content that describes the object based on the received search query;

executing a machine learning model on the user-generated content within the data structures to identify a first subset of data structures with user-generated content corresponding to feature-related data of the object therein and a second subset of data structures with user-generated content corresponding to non-feature related data therein based on patterns of words in the data structures;

dividing the first subset of data structures with the feature-related data of the object identified by the machine learning model into a plurality of clusters corresponding to a plurality of different features of the object, respectively, via execution of a topic modeling algorithm;

ranking the plurality of different features based on how many records are included in each cluster to identify a highest ranking feature;

determining a recommended upgrade to the highest ranking feature of the object from among the plurality of different features based on the execution of a topic modeling algorithm on data structures within a cluster from among the plurality of clusters which corresponds to the highest ranking feature; and outputting an identifier of the recommended upgrade to the feature of the object via the user interface.

10. The method of claim 9, further comprising converting the user-generated content into the data structures, where each data structure comprises a predefined format which includes values extracted from the user-generated content stored in predefined fields corresponding to object attributes.

11. The method of claim 9, wherein the determining comprises determining the highest priority feature to be added to the object from among the plurality of different features based on weights added to the plurality of different features by the topic modeling algorithm.

12. The method of claim 9, wherein the search query comprises one or more of a name of the object, a name of a model of the object, and a description of the object, input via one or more fields of the user interface.

13. The method of claim 9, further comprising modifying the search query to include an additional descriptive term associated with the object.

14. The method of claim 9, wherein the executing comprises identifying a new feature to add that is not present in the object based on execution of the topic modeling algorithm on the data structures within the cluster.

15. The method of claim 9, wherein the determining further comprises generating a summary description from the data structures within the cluster from among the plurality of clusters, and outputting the summary description with the recommended upgrade to the highest ranking feature via the user interface.

16. A non-transitory computer-readable medium comprising instructions which when executed by a processor cause a computer to perform a method comprising:

receiving, via a user interface, a search query associated with an object;

retrieving data structures comprising user-generated content that describes the object based on the received search query;

executing a machine learning model on the user-generated content within the data structures to identify a first subset of data structures with user-generated content corresponding to feature-related data of the object therein and a second subset of data structures with user-generated content corresponding to non-feature related data therein based on patterns of words in the data structures;

dividing the first subset of data structures with the feature-related data of the object identified by the machine learning model into a plurality of clusters corresponding to a plurality of different features of the object, respectively, via execution of a topic modeling algorithm;

ranking the plurality of different features based on how many records are included in each cluster to identify a highest ranking feature;

determining a recommended upgrade to the highest ranking feature of the object from among the plurality of different features based on the execution of a topic modeling algorithm on data structures within a cluster from among the plurality of clusters which corresponds to the highest ranking feature; and outputting an identifier of the recommended upgrade to the feature of the object via the user interface.

17. The non-transitory computer-readable of claim 16, wherein the method further comprises converting the user-generated content retrieved into the data structures, where each data structure comprises a predefined format which includes values extracted from the user-generated content stored in predefined fields corresponding to object attributes.

18. The non-transitory computer-readable of claim 16, wherein the determining comprises determining the highest priority feature from among the plurality of different features based on weights added to the plurality of different features by the topic modeling algorithm.

19. The non-transitory computer-readable of claim 16, wherein the executing comprises identifying a new feature to add that is not present in the object based on execution of the topic modeling algorithm on the data structures within the cluster.

* * * * *